C. C. HAHL AND D. McHUGH.
CAR STRUCTURE.
APPLICATION FILED MAR. 17, 1922.
1,434,490.
Patented Nov. 7, 1922.
FIG. I.
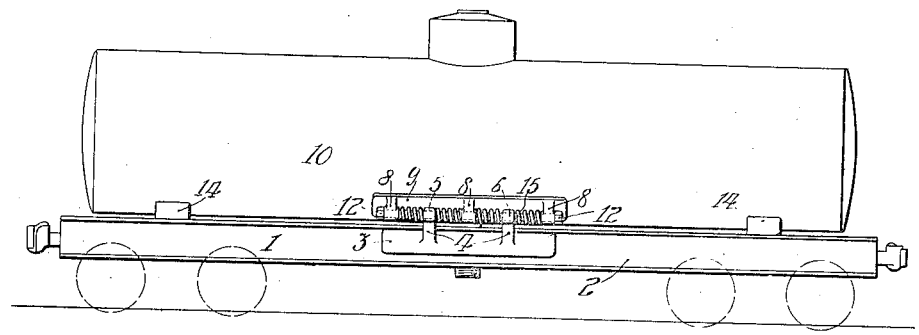
FIG. II.
FIG. III.
Inventor:
Charles C. Hahl,
and David McHugh,
by [signature]
Attorney.

Patented Nov. 7, 1922.

1,434,490

UNITED STATES PATENT OFFICE.

CHARLES C. HAHL, OF FORT WASHINGTON, AND DAVID McHUGH, OF PHILADELPHIA, PENNSYLVANIA.

CAR STRUCTURE.

Application filed March 17, 1922. Serial No. 544,590.

*To all whom it may concern:*

Be it known that we, CHARLES C. HAHL and DAVID McHUGH, citizens of the United States, respectively residing at Fort Washington, in the county of Montgomery and State of Pennsylvania, and at Philadelphia, in the State of Pennsylvania, have invented a certain new and useful Improvement in Car Structures, whereof the following is a specification, reference being had to the accompanying drawings.

Our invention is applicable to railroad tank cars with the object and effect of preventing vertical displacement of a tank with respect to the car frame while permitting limited movement of the tank longitudinally with respect to said frame, so as to minimize the strains upon the structure.

As hereinafter described, our invention includes a car frame having brackets projecting from opposite sides of the center sills thereof with abutment lugs which hold bolts extending longitudinally with respect to said frame and parallel with the axis of the tank, respectively in engagement with abutment lugs carried by brackets which are fixed upon opposite sides of the tank; said abutment lugs being so spaced, longitudinally that the tank may slide longitudinally, upon bolsters at respectively opposite ends of said frame which support its weight; but said bolts being encircled by helical springs disposed between the abutments on said frame and the abutments on said tank, so as to resiliently control and limit such longitudinal movement of the tank.

Our invention includes the various novel features of construction and arrangement hereinafter more definitely specified.

In the accompanying drawings; Fig. I is a side elevation of a railroad tank car conveniently embodying our improvements.

Fig. II is a side elevation of a portion of a car embodying a modified form of our invention.

Fig. III is a fragmentary end elevation of a car, showing the laterally spaced relation of the brackets upon its frame and the tank.

In said figures; the car frame 1 includes oppositely counterpart center sills 2, 2, which are channels extending longitudinally in said frame. The anchor brackets 3, 3 are rigidly connected with said center sills, respectively upon opposite sides thereof and, in the form of our invention shown in Fig. I, include two abutment lugs 4 which are in longitudinally spaced relation and have axially alined bolt holes 5 therethrough to receive the bolts 6. Said bolts 6 also extend through abutment lugs 8, of which there are three upon each the brackets 9, which are rigidly secured upon respectively opposite sides of the tank 10. Said bolts 6 are each conveniently removably secured in rigid relation with said brackets 9 by the nuts 12 at opposite ends of said bolts.

The arrangement above described permits and limits longitudinal movement of said tank 10, with respect to said car frame 1, by the interlocking arrangement of said abutment lugs 4 and 8, respectively upon said frame 1 and tank 10 and also prevents vertical movement of said tank upon said frame. However, in order to relieve said brackets of the weight of the tank and permit longitudinal movement of the tank; we find it convenient to support the tank by transversely extending bolsters 14, which are rigidly connected with said car frame 1 at opposite ends thereof. However, in order to resiliently control and limit the relative longitudinal movement of said frame 1 and tank 10, we provide each of said bolts 6 with springs 15, encircling the same; which springs are interposed between said abutment lugs 4 and 8 so as to receive and dissipate the longitudinal strains between the car and the tank, incident to starting and stopping the car.

Moreover, it is to be particularly noted that the resilient connection between the car frame and the tank above described permits a train to be started with far less power than if the tanks were rigidly connected with the car frames. That is to say; when the locomotive is started, it draws the car frames forward, against the pressure of said springs, and thus imposes a gradually increasing load upon the locomotive until it picks up, as it were, each of the tanks, as the limit of the relative longitudinal movement of the frames and tanks is reached.

Although we prefer to provide a plurality of the abutment lugs 4 and 8 for large size tank cars, as in Fig. I, we find that for small size tanks it is sufficient to provide the center sills 2 with a single anchor abutment 4, upon opposite sides thereof, as indicated in Fig. II.

Moreover, although we have illustrated our invention with reference to tank cars; it may be advantageously embodied in cars of other forms, for instance, coal cars.

Therefore, we do not desire to limit ourselves to the precise details of construction and arrangement herein set forth, as it is obvious that various modifications may be made therein without departing from the essential features of our invention, as defined in the appended claims.

We claim:

1. In a car structure; the combination with a frame including a pair of center longitudinal sills and bolsters at respectively opposite ends thereof; of oppositely counterpart anchor brackets, rigidly connected with the center sills of said frame and projecting laterally from opposite sides thereof; a plurality of abutment lugs on each of said brackets; each of said brackets having a bolt hole in each of said lugs; said bolt holes being in coaxial relation in the respective brackets; a tank car body, supported by said frame, and free to slide upon said bolsters; oppositely counterpart brackets rigidly connected with said tank and projecting laterally from opposite sides thereof; a plurality of abutment lugs on each of said tank brackets; each of said brackets having a bolt hole in each of said lugs; said bolt holes being in coaxial relation in the respective brackets; bolts respectively carried by said tank brackets, extending through the holes thereof, and extending through the holes in said anchor brackets; and nuts at respectively opposite ends of said bolts retaining them in rigid relation with said tank; and helical springs, encircling said bolts, and interposed between said anchor brackets and tank brackets; whereby the relative longitudinal movement of said tank and frame is resiliently controlled and limited.

2. In a car structure; the combination with a frame including a pair of center longitudinal sills and bolsters at respectively opposite ends thereof; of anchor brackets, rigidly connected with the center sills of said frame and projecting laterally from opposite sides thereof; a plurality of abutment lugs on each of said brackets; each of said brackets having a bolt hole in each of said lugs; said bolt holes being in coaxial relation in the respective brackets; a car body, supported by said frame, and free to slide upon said bolsters; brackets rigidly connected with said tank and projecting laterally from opposite sides thereof; a plurality of abutment lugs on each of said tank brackets; each of said brackets having a bolt hole in each of said lugs; said bolt holes being in co-axial relation in the respective brackets; bolts respectively carried by said tank brackets, extending through the holes thereof, and extending through the holes in said anchor brackets; nuts at respectively opposite ends of said bolts retaining them in rigid relation with said tank; and helical springs, encircling said bolts, and interposed between said anchor brackets and tank brackets; whereby the relative longitudinal movement of said tank and frame is resiliently controlled and limited.

3. In a car structure; the combination with a frame including center longitudinal sills; of anchor brackets, connected with said sills and projecting laterally from opposite sides thereof; an abutment lug on each of said brackets; each of said brackets having a bolt hole in its lug; said bolt holes being in parallel relation in the respective brackets; a tank car body, supported by said frame; brackets rigidly connected with said tank and projecting laterally from opposite sides thereof; a plurality of abutment lugs on each of said tank brackets; each of said brackets having a bolt hole in each of said lugs; said bolt holes being in coaxial relation in the respective brackets; bolts respectively carried by said tank brackets, extending through the holes thereof, and extending through the holes in said anchor brackets; nuts at respectively opposite ends of said bolts retaining them in rigid relation with said tank; and springs, encircling said bolts, and interposed between said anchor brackets and tank brackets; whereby the relative longitudinal movement of said tank and frame is resiliently controlled and limited.

4. In a car structure; the combination with a frame; of anchor brackets connected with said frame projecting laterally at opposite sides thereof; an abutment lug on each of said brackets; each of said brackets having a bolt hole in its lug; a car body, supported by said frame; brackets connected with said body and projecting laterally at opposite sides thereof; an abutment lug on each of said body brackets; each of said brackets having a bolt hole in each of said lugs; said bolt holes being in coaxial relation in the respective brackets; bolts extending through said holes; nuts at respectively opposite ends of said bolts retaining them in said brackets; and springs interposed between said anchor brackets and body brackets; whereby the relative longitudinal movement of said body and frame is resiliently controlled and limited.

5. In a car structure; the combination with a frame; of anchor brackets connected with said frame at opposite sides thereof; a car body, supported by said frame; brackets connected with said body at opposite sides thereof; bolts extending through said frame brackets and body brackets connecting them for relative longitudinal movement, and preventing transverse movement thereof; said frame and body being relatively longitudinally movable; and springs, encircling said bolts, interposed between said frame brackets and body brackets; whereby the relative longitudinal movement of said body and frame is resiliently controlled and limited, and relative transverse movement of said body and frame is prevented.

In testimony whereof, we have hereunto signed our names at Philadelphia, Pennsylvania, this fourteenth day of March, 1922.

CHARLES C. HAHL.
DAVID McHUGH.

Witnesses:
CAROLYN E. REUTER,
EUNICE GRANT.